Patented Nov. 28, 1944

2,363,730

UNITED STATES PATENT OFFICE 2,363,730

MANUFACTURE OF NITROGEN-FORTIFIED WHEY CONCENTRATE

Lloyd A. Hall, Chicago, Ill., assignor to Nicholas L. Simmons, Norrie, Wis.

No Drawing. Application December 16, 1942, Serial No. 469,215

6 Claims. (Cl. 99—10)

The present invention relates generally to edible products for both animal and human consumption, and in particular it relates to a whey concentrate containing hydrolyzed protein, and to a process of making the same.

Whey is the product remaining after the removal of casein and fat from milk, and in commerce its usual source is the cheese industry, although it is derived also from the production of casein as such. It is common practice to concentrate whey to a powder or to a liquid concentrate by suitable evaporative procedures. The whey itself, and its concentrates are distinctly acid, and lactic acid is the chief source of the acidity. In concentrating whey, the acid itself is concentrated, whereby the concentrates are more acid than the whey.

In whey, there is residual protein derived largely from the water soluble proteins of milk. There is also lactose, which in fermentation yields lactic acid. One of the many advantages of whey or its concentrates is the nitrogenous food value.

Hydrolysis of protein produces amino acids as ultimate products of hydrolysis, and a variety of products which are intermediate between amino acid and protein, such as proteoses, peptones, peptides, and poly-peptides. Hydrolysis of protein may be effected by acid. Strong acid acting for a long time completes hydrolysis to amino acids, and for shorter times may leave such intermediate products. Mild or weak acids acting even for long times may produce some amino acids, and also such intermediate products, and may leave some protein unhydrolyzed or insufficiently broken down to form said intermediate products.

It is an object of the present invention to produce a whey concentrate having higher nitrogenous food value than concentrated normal whey.

It is an object of the present invention to produce a whey concentrate by a prolonged heating of acid whey, in the presence of added protein, whereby to effect hydrolysis of added protein during the concentration.

It is a particular object of the invention to produce a pasty concentrate of whey and hydrolyzed added protein.

It is a further object of the invention to produce a whey product having a nitrogen content of animal body origin in hydrolyzed form, which content exceeds that of normal whey.

Various other and ancillary objects and advantages of the invention will become apparent from the following description and explanation of the invention.

The nature of whey varies with the industry of its origin, for example, the cheese and casein industries, and it also varies within the industry by the process used to effect the precipitation of the casein in the milk, usually the skimmed milk. Mere fermentation of milk effects precipitation of casein as a result of the acidity of lactic acid produced by the fermentation of the lactose (milk sugar) content of fresh milk. But instead of resorting to such fermentation, agents are frequently added to effect precipitation, such as rennet, or acid, such as sulfuric acid. By far the largest source of whey is the cheese industry, commonly employing fermentation or rennet.

Whey may be classified as sweet or sour. Sour whey is that having considerable lactic acid. Sweet whey is that having much of the original lactose unfermented, and lacking a casein-precipitating content of lactic acid, irrespective of a small amount of such acid which may exist without precipitating casein.

A considerable content of lactic acid is desired for the present invention, and, therefore, where the raw whey to be utilized is sweet whey, it is permitted to ferment. This may be done by holding it without chilling, as at 70° to 80° F., for a sufficient time, 24 hours being satisfactory. The time objective is to secure a whey having at least about 1% of acid calculated as lactic acid. In practice, to secure the desired acidity, sweet whey and sour whey may be mixed, and a shortened time of fermentation permitted until at least the desired amount of lactic acid is present. Also sour whey, concentrated or not, having more than 1% of lactic acid may be mixed with sufficient sweet whey to produce a mixed whey having about 1% of acidity, calculated as lactic acid. Sweet whey may be fermented until at least 1%, or even more, of acidity, as lactic acid, is present.

The following is a representative analysis of cheese whey:

| | Per cent |
|---|---|
| Water | 94.27 |
| Solids | 5.73 |
| Protein | .90 |
| Fat | .15 |
| Lactose | 3.94 |
| Ash | .60 |
| Acid, as lactic acid | .24 |

Where acid is used as a casein precipitant, especially sulfuric acid, the whey is usually free from excess or free acid, because the added acid combines with calcium content to form a calcium salt, such as calcium sulfate. Such a whey is still a sweet whey, and can be rendered sour by fermentation to produce lactic acid from the lactose.

According to the present invention the acidity of whey having about 1% acidity, calculated as lactic acid, resulting from fermentation, is employed at the evaporating temperature of a concentrating process, to effect hydrolysis of protein added to the whey. The protein chosen may be of any type, the choice of it determining the amino-acid components of the hydrolysate, and the extent of time of hydrolysis, determining the content of amino acids per se and the extent and distribution of the hydrolytic products.

Proteins are built-up molecules which can be broken down to constituent building blocks, called amino acids, of which there are a large number. It is well known that the value of various proteins as foods depends upon the content of such building blocks. Animal and human requirements in protein are expressed in terms of amino-acid requirements. Not all proteins are sufficient in their constitution to meet complete requirements. Therefore, the choice of the protein for the present invention in part controls the actual food value of the final product in terms of nitrogen food value.

For a high degree of sufficiency in nitrogen food value, the preferred protein is one of animal body origin, because it contains a large number of the amino acids now considered essential to the animal system, in addition to many amino acids now considered non-essential. Where the food product of the present invention is intended for use as animal feed, it is most desirable that the protein building blocks in it are those required by the animal body. This is assured by using animal-body protein as a source for them.

Proteins vary also in their digestibility for both animal and human. Digestion of protein is a process comparable to hydrolysis, leading toward release of the building blocks for re-assembly by the body processes into new body proteins. External hydrolysis of protein is like a pre-digestion, and facilitates or substitutes for the normal digestion process. The provision of hydrolyzed protein, in a food, makes the food more valuable as an assimilatable food, irrespective of what the combination of protein building blocks may be.

Animal feeds must be low-cost materials, and are supplied from by-products of more costly food materials. Thus, whey is a by-product, and often a waste-product, of the cheese and casein industries. Corn gluten is corn protein, and a by-product of the corn refining industry, sold largely as animal feed. It contains protein constituents which are hard to digest by humans. Cracklings is a protein by-product of the lard and other animal-fat industries, also used as animal feed.

Where the present invention uses animal body protein, as the protein to be added to whey, cracklings is an excellent low cost source. It is derived by rendering animal body fat, to yield liquid fat, which leaves a residual tissue of the body fat. The residue is mechanically pressed to squeeze out adherent fat, and the compress cake is called "cracklings." It may be further extracted with fat solvents, and with or without such extraction it may be used in the present invention. The common press cake of the lard industry has 55% to 65% protein and 10% to 15% of fat. However, the actual content of fat or protein is not critical. Fat in the cracklings merely adds to the fat content of the food product.

Animal cracklings contains the following so-called essential (to the animal body) amino acids: lysine, phenylalanine, histidine, arginine, leucine, isoleucine, methionine, and valine, and others which are now considered non-essential.

The following table shows an average analysis of condensed whey of present commercial practice, and an analysis of an improved whey concentrate of the present invention, using cracklings:

|  | Whey concentrate | Nitrogen-fortified whey concentrate |
| --- | --- | --- |
|  | Per cent | Per cent |
| Water (by difference) | 58.62 | 64.34 |
| Total solids | 41.38 | 35.66 |
| Lactose | 34.65 | 36.16 |
| Protein (N×6.38) | 7.95 | 9.06 |
| Fat |  | .03 |
| Ash | 8.00 | 9.05 |
| Acid (as lactic) | 8.02 | 10.04 |
| Amino acids | .10 | 1.10 |

In addition, each product has vitamins such as $B_2$ or G, and other minor content; the present invention not effecting new changes in normal concentrated whey constituents, but adding nitrogen value, and changing added protein to hydrolyzed protein in process. The hydrolyzed protein is more soluble than the added unhydrolyzed protein, with the result that the mass changes from an initial suspension of protein in whey, to a concentrate with more soluble constituents than the initial mixture. Its consistency as a liquid concentrate permits packing it as a jelly-like paste in drums or barrels. Where such packed material may be exposed to evaporation, a film or skin forms over the surface which provides protection against evaporation deeper into the mass, thus preserving the original character.

Experience has shown that the initial hot concentrate tends to granulate if held static, as by packing it immediately into containers, then cooling. To avoid this, the hot concentrate may be subjected to a curing process. This comprises cooling the mass and homogenizing it before confining it in more or less static condition. The preferred curing method comprises placing the hot concentrate in a pool of shallow depth, say 6 inches, and working the same occasionally during or only at the end of a cooling period, such as 24 hours. Thus, the resulting paste is more homogeneous and uniformly viscous, to retain a stable physical form when housed in suitable containers.

The acid content serves as a preservative against spoilage.

The following example shows how the invention is carried out in practice.

*Example.*—Liquid sour whey having at least 1% acidity, calculated as lactic acid, and ground press cake of animal cracklings, are thoroughly mixed and concentrated in a vacuum evaporator at 140° F. to 155° F., at 27 to 28 inches. Where 20,000 pounds of whey and 100 pounds of cracklings are used, about 5 hours is required to effect the concentration to a mass of 2,200 lbs.

The mass is then exposed in the curing pool for 24 hours, losing about 200 lbs. by evaporation. It may be worked during or at the end of the cooling period. The resulting cooled plastic paste is then placed in barrels or other containers.

In the above example, other proteins may be mixed with or substituted for the animal cracklings. Waste meat or fish trimmings, casein, corn or wheat gluten, animal blood, albumin, and the like may be used alone or in mixtures. For human consumption more care in selection and preparation of the protein is, of course, required. But since the preferred use of the invention is as a principal or supplemental feed for animals or fowl, the various low cost proteins which are available industrially, or in the feed market, may be selected.

The product is of jelly-like consistency, and is stable against heat from 0° to 110° F., above which higher temperature it tends to liquefy. The protein supplied by addition to whey is more digestible as a result of the hydrolysis and, therefore, of greater value. The consistency and stability of whey concentrate as a manageable feed is greatly improved by the presence of the added protein and its hydrolysis products.

In place of concentrating the whey and protein to a liquid concentrate, the mixture may be heated for a time of several hours to effect hydrolysis to any desired degree toward completion, but preferably at a temperature not over 155° F., to avoid darkening in color and change of taste, as a result of scorching of the lactose content. The liquid after heating, with or without some degree of concentration, may be spray-dried to a powder form. However, for animal food use, this is not desired, because the powder is hydroscopic and it does not maintain a desirable manageable form for feed use.

As human food, the paste or powder concentrate may be used as or in a beverage, in soup or soup stock, or in bakery goods, such as breads or cakes.

Various departures from the illustrations and uses above given are considered to fall within the scope of the invention as expressed in the appended claims.

I claim:

1. The method of producing a food material from a protein and whey, which comprises hydrolyzing the protein with a liquid having the solids of sour milk whey and having an acidity of at least 1% calculated as lactic acid.

2. The method of producing a food material from a protein and whey, which comprises hydrolyzing the protein with sour milk whey having an acidity of at least 1% calculated as lactic acid.

3. The method of producing a food concentrate which comprises mixing to a fluid mass protein and sour milk whey having an acidity of at least 1% calculated as lactic acid, and slowly evaporating water at an elevated temperature from said mixture, while concentrating the mass to a fluid concentrate and simultaneously hydrolyzing protein.

4. The method of producing a food concentrate which comprises mixing to a fluid mass protein and sour milk whey having an acidity of at least 1% calculated as lactic acid, slowly evaporating water at an elevated temperature from said mixture, while concentrating the mass to a fluid concentrate and simultaneously hydrolyzing protein, cooling the resulting concentrate, homogenizing the cooled concentrate, and placing the homogenized concentrate in one or more containers.

5. The method of producing a food concentrate which comprises mixing to a fluid mass protein and sour milk whey having an acidity of at least 1% calculated as lactic acid, heating the resulting mixture while effecting hydrolysis of protein, and evaporating water from the mass to form a whey concentrate containing hydrolytic products of said protein.

6. The method of forming a food product from sweet milk whey which comprises fermenting the sweet whey to the point of forming a whey with at least 1% acidity calculated as lactic acid, and slowly evaporating water from the whey at an elevated temperature in the presence of added protein, while hydrolyzing said protein by the said acidity.

LLOYD A. HALL.